US008325588B2

(12) United States Patent
Kim et al.

(10) Patent No.: US 8,325,588 B2
(45) Date of Patent: Dec. 4, 2012

(54) ITERATIVE RECEPTION METHOD AND ITERATIVE RECEIVER

(75) Inventors: Seong-Rag Kim, Daejeon (KR); Jun-Young Nam, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 479 days.

(21) Appl. No.: 12/515,309

(22) PCT Filed: Nov. 16, 2007

(86) PCT No.: PCT/KR2007/005792
§ 371 (c)(1),
(2), (4) Date: May 18, 2009

(87) PCT Pub. No.: WO2008/066271
PCT Pub. Date: Jun. 5, 2008

(65) Prior Publication Data
US 2010/0034110 A1 Feb. 11, 2010

(30) Foreign Application Priority Data

Dec. 1, 2006 (KR) .................. 10-2006-0120747
Apr. 17, 2007 (KR) .................. 10-2007-0037631

(51) Int. Cl.
*H04J 11/00* (2006.01)
*H04W 4/00* (2009.01)
*H04B 7/216* (2006.01)
*H04B 1/00* (2006.01)
(52) U.S. Cl. ......... 370/203; 370/328; 370/342; 375/148
(58) Field of Classification Search .................. 370/203, 370/208, 209, 328–342
See application file for complete search history.

(56) References Cited

U.S. PATENT DOCUMENTS 6,741,634 B1 * 5/2004 Kim et al. .................. 375/144
7,324,584 B1 * 1/2008 Vigneron et al. ............. 375/150
(Continued)

FOREIGN PATENT DOCUMENTS
EP 0949766 B1 10/2004
(Continued)

OTHER PUBLICATIONS

Padam L. Kafle and Abu B. Sesay, Iterative Semi-Blind Multiuser Detection for Coded MC-CDMA Uplink Systems, IEEE Transactions on Communications, Jul. 2003, pp. 1034-1039, vol. 51, No. 7.
(Continued)

*Primary Examiner* — Xavier Szewai Wong
(74) *Attorney, Agent, or Firm* — Kile Park Goekjian Reed & McManus PLLC (57) ABSTRACT

An iterative reception method and iterative receiver in a mobile communication system are provided. In order to remove inter-cell interference of a signal that is iteratively received in a multi-cell environment, a soft determination value of different cells excluding a specific cell is re-spread to be used. In addition, in order to improve reception performance of the iterative receiver that performs the interference removal by using the soft determination value, channel estimation is iteratively performed on the iteratively received signal by using a soft determination value of a previous order of the specific cell to update a channel estimation value. Accordingly, it is possible to reduce complexity of implementation and effectively remove the inter-cell interference by using the soft determination value.

16 Claims, 7 Drawing Sheets

U.S. PATENT DOCUMENTS

| | | | |
|---|---|---|---|
| 2004/0076245 A1* | 4/2004 | Okamoto et al. | 375/341 |
| 2004/0170235 A1* | 9/2004 | Turin | 375/341 |
| 2005/0063339 A1* | 3/2005 | Jeong et al. | 370/331 |
| 2005/0130592 A1* | 6/2005 | Dowling | 455/63.1 |
| 2005/0169393 A1* | 8/2005 | Lozhkin et al. | 375/260 |
| 2005/0232195 A1 | 10/2005 | Jones | |
| 2006/0013289 A1 | 1/2006 | Hwang | |
| 2006/0094372 A1* | 5/2006 | Ahn et al. | 455/67.13 |
| 2008/0019429 A1* | 1/2008 | Reznik | 375/148 |
| 2008/0285691 A1* | 11/2008 | Onggosanusi et al. | 375/346 |

FOREIGN PATENT DOCUMENTS

| | | |
|---|---|---|
| KR | 10-2004-0007249 A | 1/2004 |
| KR | 10-2007-0064933 A | 6/2007 |
| WO | WO 2009/078603 A1 * | 6/2009 |

OTHER PUBLICATIONS

Christian Kuhn and Joachim Hagenauer, Single Antenna Interference Cancellation Using a List-Sequential (LISS) Algorithm, IEEE Globecom 2005, pp. 1604-1608.

Pekka A. Ranta, Ari Hottinen and Zhi-Chun Honkasalo, Co-channel interference cancelling receiver for TDMA mobile systems, Proc IEEE ICC'95, 1995, pp. 17-21.

International Search Report of International Application No. PCT/KR2007/005792 filed on Nov. 16, 2007.

Written Opinion of International Application No. PCT/KR2007/005792 filed on Nov. 16, 2007.

* cited by examiner

ITERATIVE RECEPTION METHOD AND ITERATIVE RECEIVER

TECHNICAL FIELD

The present invention relates to an iterative reception method and an iterative receiver in a mobile communication system. More particularly, the present invention relates to an iterative reception method and an iterative receiver for removing inter-cell interference from a received signal that is iteratively received in a multi-cell environment.

This work was supported by the IT R&D program of MIC/IITA[2006-S-001-01, Development of Adaptive Radio Access and Transmission Technologies for 4th Generation Mobile Communications].

BACKGROUND ART

In a mobile communication system such as a multicarrier-code division multiple access (MC-CDMA) system, intra-cell inter-user-symbol interference can be effectively removed or avoided due to orthogonality of spread codes. However, in a multi-cell environment, inter-cell interference cannot be effectively removed or avoided. The inter-cell interference greatly deteriorates mobility and stability of the mobile communication system in a cell boundary region. Particularly, in a downlink of the MC-CDMA system, a terminal having a multiple receiving antenna can relatively easily alleviate the inter-cell interference by using space-time diversity, but there is a problem in that a terminal having a single receiving antenna cannot easily alleviate the inter-cell interference.

Recently, approaches for removing the inter-cell interference in the MC-CDMA system have not been actively researched. As an approach for removing the inter-cell interference in the MC-CDMA system, there is proposed an iterative reception scheme based on minimum mean squared error (MMSE) multiuser detection (MUD). However, in the approach, since the number of multi-carriers (for example, 1024) or an inverse of a matrix having a dimension of arbitrary spread factors need to be calculated for each symbol, there is a problem in that relatively large complexity occurs.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide an iterative reception method and an iterative receiver having advantages of removing inter-cell interference in a multi-cell environment In addition, the present invention has been made in an effort to provide an iterative reception method and an iterative receiver having advantages of efficiently removing inter-cell interference and providing low complexity to a terminal using a single antenna in a downlink of a mobile communication system.

Technical Solution

An embodiment of the present invention provides an iterative reception method in which a receiver iteratively receives a signal including a first cell signal and at least one different-cell signal in a multi-cell environment, wherein the iterative reception method includes performing soft determination on the cell signals included in the received signal and outputting soft determination values corresponding to the cell signals, and estimating an inter-cell interference signal corresponding to the at least one different-cell signal by using remaining soft determination values excluding the soft determination value corresponding to the first cell signal from the soft determination values and removing the inter-cell interference signal from the received signal.

Another embodiment of the present invention provides an iterative receiver for iteratively receiving a signal including a first cell signal and at least one second cell signal in a multi-cell environment, including: a first soft determination unit that performs soft determination on the second cell signal and outputs a first soft determination value, and a parallel interference remover that estimates an inter-cell interference signal by using the first soft determination value and removes the inter-cell interference signal from the received signal.

Advantageous Effects

According to the present invention, an iterative reception method and an iterative receiver in a mobile communication system can remove inter-cell interference in a multi-cell environment by using a soft determination value corresponding to signals received from remaining cells excluding a specific cell. Accordingly, it is possible to reduce complexity of an implementation method and effectively remove the inter-cell interference in comparison with a conventional method of removing the interference in which an inverse of a matrix having a dimension of arbitrary spread factors needs to be calculated for every symbol.

In addition, the channel estimation value is iteratively updated by using a soft determination value of a received signal of a previous order, so that a more accurate channel estimation value is obtained. Accordingly, it is possible to improve reception performance of the iterative receiver.

MODE FOR INVENTION

Hereinafter, embodiments of the present invention are described in detail with reference to the accompanying drawings in detail so that the ordinarily skilled in the related art can easily implement the present invention. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, it should be noted that a phrase that a portion "includes" an element means that the other element is not excluded but it can be further included therein if a particularly contrary phase is not disclosed. In addition, it should be noted that terms "unit", "member", and "block" disclosed in the specification denote a unit for performing at least one function or operation, and it can be implemented as a combination of hardware, software, or hardware and software.

Now, an iterative reception method and an iterative receiver in an MC-CDMA system as an example of a mobile communication system according to an embodiment of the present invention, in which a terminal using a signal receiving antenna removes inter-cell interference, are described with reference to the accompanying drawings. Although the MC-CDMA system is described in the embodiment of the present invention, the present invention can be adapted to other mobile communication systems such as a spread orthogonal frequency division multiplexing (OFDM) system.

In the mobile communication system according to the embodiment of the present invention, a receiver that is located in a boundary of a cell receives a signal from multiple cells, and a subcarrier corresponding to a specific receiver that is to remove the inter-cell interference by using iterative reception is allocated to the same positions of all the cells. In addition, the present invention is employed to only the receiver located in the cell boundary where the inter-cell interference needs to be removed, but is not employed to the receiver located at the center of cell where the inter-cell interference does not need to be removed.

Further, in the mobile communication system according to the embodiment of the present invention, the receiver is allocated with a control channel including information on modulation and decoding schemes of all cell signals so that the receiver can perform the modulation and decoding on a signal transmitted from a specific cell and signals transmitted from other cells.

Firstly, in an MC-CDMA system model used in the embodiment of the present invention, a transmitting signal $s_q$ of a q-th cell in the MC-CDMA system having Q cells, L subcarriers, L spread factors, and $K_q$ users in the multi-cell environment is expressed by Equation 1, as follows.

$$S_q = \sum_{k=1}^{K_q} c_{q,k} b_{q,k}$$ (Equation 1)

Here, $c_{q,k}$ denotes a product of a spread code of a k-th user of the q-th cell and a scramble code for cell identification, and $b_{q,k}$ denotes a transmitting symbol. If an orthogonal spreading matrix of the q-th cell is set to $C_q=[c_{q,1}, c_{q,2}, \ldots, c_{q,K}]$, then $C_q^H C_q = I$ is satisfied. In addition, it is assumed that energy of an l-th subcarrier signals $S_{q,l}$ of a transmitting signal of the q-th cell satisfies $E[|s_{q,l}|^2]=1$. Further, a received signal vector r in a frequency domain, which is received by the receiver of the terminal, is expressed by Equation 2 as follows.

$$r = \sum_{q=1}^{Q} H_q C_q b_q + n$$ (Equation 2)

$$= \sum_{q=1}^{Q} H_q s_q + n$$

Here, $H_q$ denotes a channel matrix that can be expressed by $H_q = \text{Diag}(h_{q,0}, h_{q,1}, \ldots, h_{q,L-1})$. In addition, $b_q$ denotes a user signal, and n denotes a noise vector.

Intra-cell inter-user-symbol interference can be effectively removed from the received signal expressed by Equation 2 by recovering orthogonality of a channel and performing de-spreading using a single-tap equalizer in the frequency domain. However, since scramble codes of cells may not have orthogonality, the inter-cell interference cannot be removed from the received signal.

Now, an iterative receiver that removes the inter-cell interference in the terminal using a single antenna in the MC-CDMA system according to the embodiment of the present invention is described in detail based on the aforementioned MC-CDMA system model.

In addition, in the embodiment of the present invention, a single-tap MMSE equalizer based on minimum mean squared error (MMSE) channel equalization is used an example of the aforementioned single-tap equalizer for removing the intra-cell inter-user-symbol interference.

Figure 1:
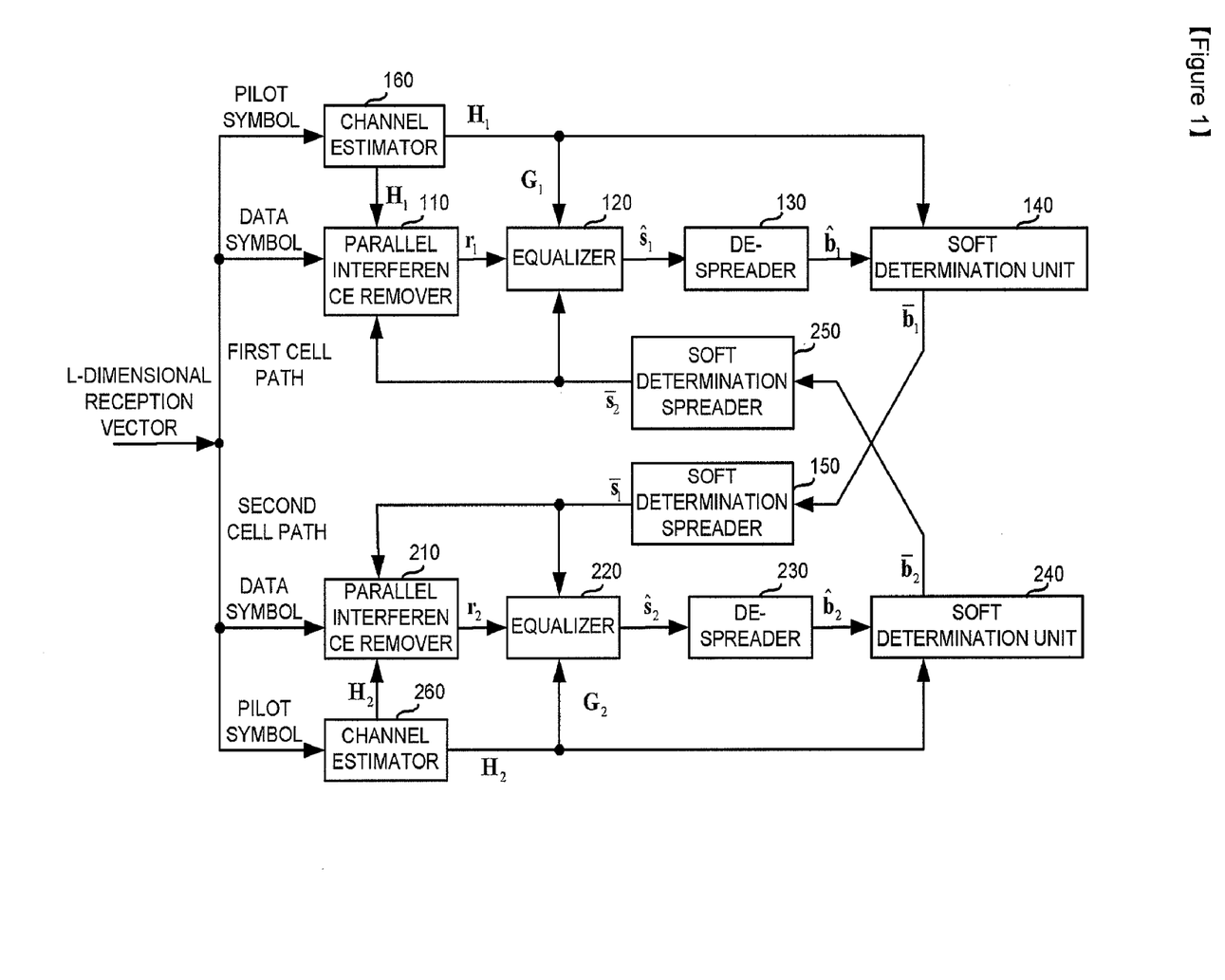
FIG. 1 is a diagram illustrating a configuration of an iterative receiver in an MC-CDMA system according to an embodiment of the present invention.

FIG. 1 is a diagram illustrating a configuration of an iterative receiver in the MC-CDMA system according to the embodiment of the present invention, in a case where signals are removed from cells.

The iterative receiver according to the embodiment of the present invention has interference removal paths for cells in order to remove the inter-cell interference. For example, as shown in FIG. 1, when two cell signals are received, the iterative receiver performs interference removal on the signals of the first and second cells through the first and second cell paths, respectively. A soft determination value of a different cell signal used for removing the inter-cell interference from a cell signal received by the iterative receiver is calculated by using a signal obtained by removing the inter-cell interference from the different cell signal. For this reason, there is also a need to remove the inter-cell interference from the different cell signal.

As described above, in FIG. 1, two interference removal paths for the signals received from the two cells are exemplified for the convenience of description of the embodiment of the present invention. However, the present invention is not limited thereto, and the number of interference removal paths may be varied depending on the number of cell signals received by the iterative receiver of the terminal in the multi-cell environment.

In addition, well-known components of the iterative receiver such as a discrete Fourier transformation (DFT) unit and a cyclic prefix remover can be easily implemented as initial-stage apparatuses by the ordinarily skilled in the related art, and thus description thereof is omitted in the description of the iterative receiver of the MC-CDMA system.

Referring to FIG. 1, since the two cell signals are received by the iterative receiver of the terminal in MC-CDMA system, the interference removal paths include two parallel interference removers 110 and 210, two equalizers 120 and 220, two de-spreaders 130 and 230, two soft determination units 140 and 240, two soft determination spreaders 150 and 250, and two channel estimators 160 and 260.

The channel estimators 160 and 260 iteratively update channel estimation values by using pilot symbols of iteratively-received signals and output the channel estimation values. Here, the pilot symbols corresponding to the cells are individually input to the channel estimators 160 and 260 through the interference removal paths corresponding to the cells, and are individually processed. A channel estimation method used by the channel estimators 160 and 260 are described in detail later.

The parallel interference removers 110 and 210 receive data symbols of the iteratively-received signals and iteratively remove the inter-cell interference. More specifically, the received signal is input to the parallel interference removers 110 and 210 through the individual interference removal paths corresponding to the cell signals, and each of the parallel interference removers 110 and 210 removes the inter-cell interference of the remaining cell signals excluding a specific cell signal from the data symbol input through a specific interference removal path. Here, "specific cell signal" denotes a cell signal input through the interference removal path of a specific one of the parallel interference removers 110 and 210 in the received signal, and "specific cell" denotes a cell corresponding to the specific cell signal. Namely, referring to FIG. 1, a first cell signal is the specific cell signal corresponding to a first cell path among the interference removal paths, and a second cell signal is the specific cell signal corresponding to a second cell path among the interference removal paths.

On the other hand, in order to remove the inter-cell interference of the different cell signal from the specific cell signal, each of the parallel interference removers 110 and 210 uses a spread value of a soft determination value output from one of the soft determination units 240 and 140 corresponding to the different cell signal. For example, in order to alleviate the interference of the second cell signal to the first cell signal, the spread soft determination value corresponding to the second cell signal is used, and in order to alleviate the interference of the first cell signal to the second cell signal, the spread soft determination value corresponding to the first cell signal is used. Namely, the interference signals corresponding to the different cell signals can be estimated based on the spread soft determination values, and the interference signals are removed from the signals input to the inter-cell parallel interference removers 110 and 210 so that the inter-cell interference can be alleviated and output.

The equalizers 120 and 220 receive the signals of which inter-cell interference is alleviated by the parallel interference removers 110 and 210 and perform channel equalization on subcarrier signals included in the cell signals. The equalizers 120 and 220 use the channel estimation values generated by the channel estimators 160 and 260 for the channel equalization. As a result, the orthogonality of the channel-equalized signals can be recovered. As described above, in the embodiment of the present invention, the single-tap MMSE equalizer based on MMSE is used for the channel equalization, and one equalizer includes single-tap MMSE equalizers of which number corresponds to the number of subcarrier signals in the specific cell signal.

The de-spreaders 130 and 230 receive the orthogonality-recovered signals from the equalizers 120 and 220 and perform de-spreading.

The soft determination units 140 and 240 generate the soft determination values from the de-spread signals output from the de-spreaders 130 and 230 and output the soft determination values. Each soft determination value is a value obtained by performing soft determination on a specific user symbol to which interference of different user symbols in the specific cell is alleviated. The term "specific user symbol" denotes a user symbol corresponding to an iterative receiver in the specific cell signal. A calculation method for the soft determination values is described in detail later by using equations.

The soft determination spreaders 150 and 250 perform re-spreading on the soft determination values received from the soft determination units 140 and 240 and output the re-spread soft determination values to the parallel interference removers 110 and 210 of the different cells excluding the specific cell. The re-spread soft determination values of the cells are used for removing the interference of the specific cell signal from the different cell signals excluding the specific cell.

Although a case where the iterative receiver receives two cell signals is exemplified in FIG. 1 for convenience of description of the embodiment of the present invention, the present invention is not limited thereto, and the iterative receiver may receive two or more cell signals. In this case, the iterative receiver includes interference removal paths (parallel interference removers, channel estimators, equalizers, de-spreaders, soft determination units, and soft determination spreaders) corresponding to the cell signals, and each of the parallel interference removers corresponding to each cell signal may receive and use at least one soft determination value for removing inter-cell interference.

Figure 2:
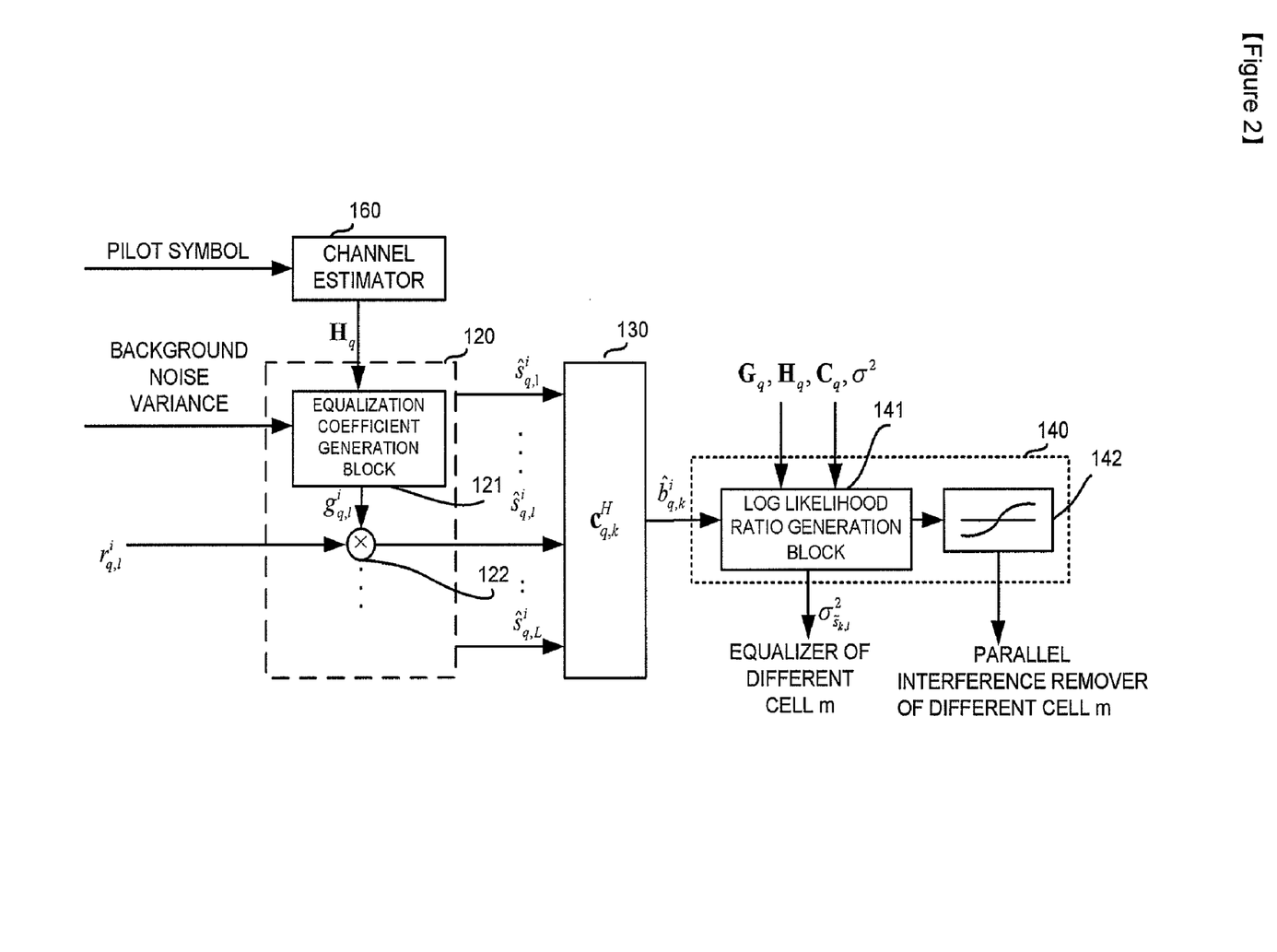
FIG. 2 is a detailed diagram illustrating a configuration of an equalizer of the iterative receiver according to the embodiment of the present invention.

FIG. 2 is a detail diagram illustrating a configuration of the equalizer 120 of the iterative receiver according to the embodiment of the present invention, in which an example of the aforementioned single-tap MMSE equalizer corresponding to the l-th subcarrier signal in the equalizer corresponding to the equalizer 120 corresponding to the q-th cell signal is illustrated.

Referring to FIG. 2, the equalizer 120 may include single-tap MMSE equalizers of which number corresponds to the number of subcarrier signals included in the cell signal, and one single-tap MMSE equalizer may include an equalization coefficient generation block 121 and an equalizer 122.

The equalization coefficient generation block 121 receives the channel estimation value output from the channel estimator 160, an interference noise variance value, and a background noise variance value, and generates an equalization coefficient. The background noise variance value is empirically obtained. A method of generating the equalization coefficient in the equalization coefficient generation block 121 is described later in detail.

The equalizer 122 performs the channel equalization on an input signal by using the equalization coefficient output from the equalization coefficient generation block 121.

The signal that is equalized in units of a subcarrier signal is subjected to the de-spreading in the de-spreader 130 and output to the soft determination unit 140.

Figure 3:
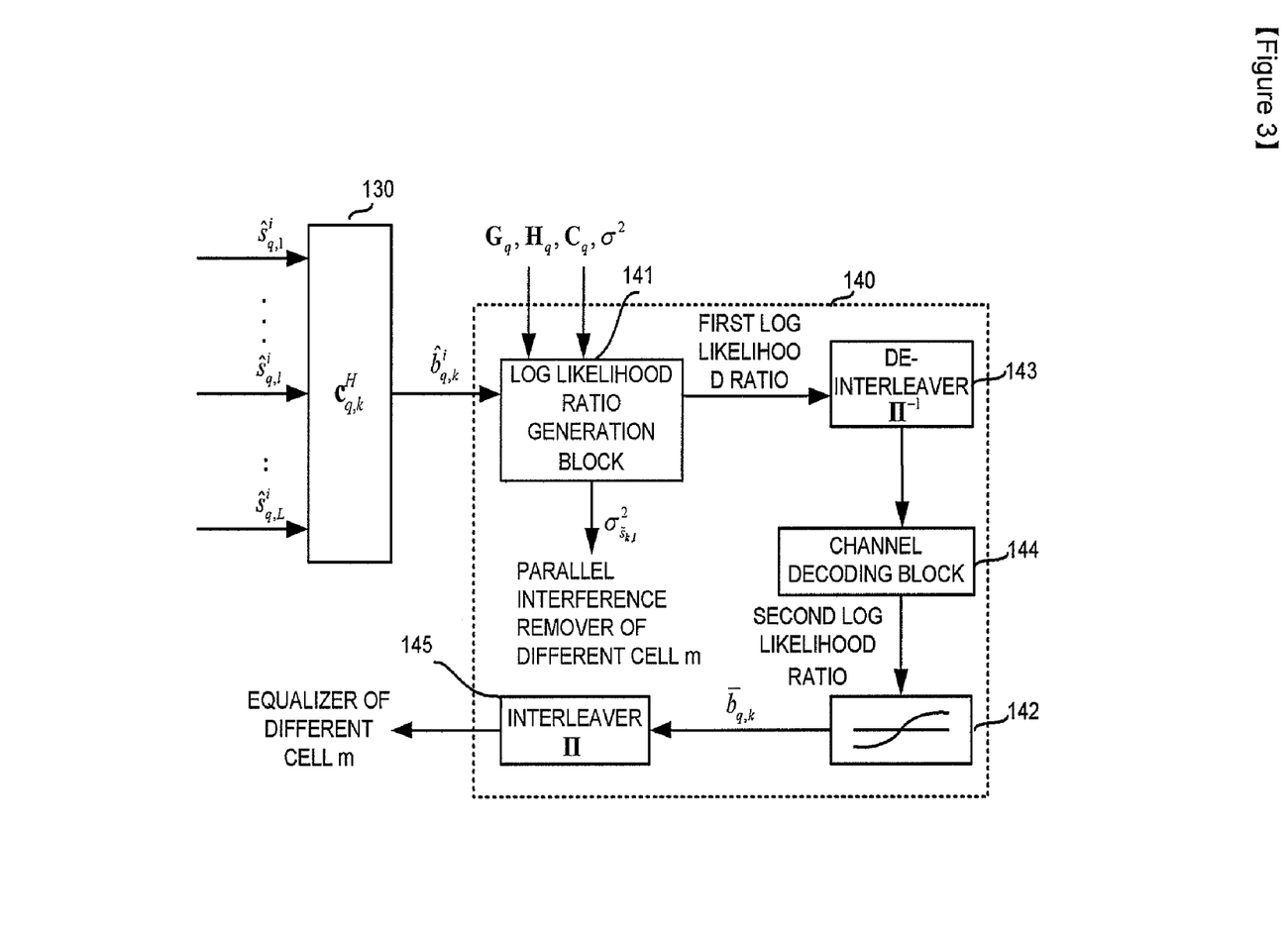
FIG. 3 is a detailed diagram illustrating a configuration of a soft determination unit of the iterative receiver according to the embodiment of the present invention.

FIG. 3 is a detailed diagram illustrating a configuration of the soft determination unit 140 of the iterative receiver according to the embodiment of the present invention in a case where there is inter-cell cooperation.

As shown in FIG. 3, the soft determination unit 140 may include a log-likelihood ratio (LLR) generation block 141, a determination unit 142, a deinterleaver 143, a channel decoding block 144, and an interleaver 145. On the other hand, in a case where there is no inter-cell cooperation, the soft determination unit 140 may be configured by excluding the deinterleaver 143, the channel decoding block 144, and the interleaver 145.

The log-likelihood ratio generation block 141 receives the signal that is subjected to de-spreading in the de-spreader 130 and generates a log-likelihood ratio of the signal. Hereinafter, the log-likelihood ratio output from the log-likelihood ratio generation block 141 is referred to as a first log-likelihood ratio. The log-likelihood ratio generation block 141 also outputs the interference noise variance value, which is input to the equalizer 120 and used to generate the equalization coefficient.

The deinterleaver 143 deinterleaves the first log-likelihood ratio. Namely, the deinterleaving is performed in the reverse order of the interleaving that is performed before a transmitter transmits data.

The channel decoding block 144 performs channel decoding on the output of the deinterleaver to improve reliability of the log-likelihood ratio. Hereinafter, the log-likelihood ratio output from the channel decoding block 144 is referred to as a second log-likelihood ratio. The channel decoding block 144 generates the log-likelihood ratio by using an MAP (Maximum A Posteriori) decoding algorithm.

The determination unit 142 performs soft determination by using the log-likelihood ratio (the first log-likelihood ratio or the second log-likelihood ratio) and outputs the soft determination value. The output soft determination value is interleaved by the interleaver 145 and output to the de-spreader 150.

Next, the soft determination value and the interference noise variance value generated by the soft determination unit 140 are subjected to de-spreading and are used for generation of the equalization coefficient and removal of the inter-cell interference corresponding to different cell signals.

Now, an iterative reception method in which a terminal performs removal of inter-cell interference in an MC-CDMA system according to the embodiment of the present invention is described in detail with reference to the accompanying drawings.

A pilot symbol used for channel estimation is a general pilot symbol without additional restriction conditions. In addition, it is assumed that accurate channel estimation is performed by the channel estimator 160 in the following description of a method of removing interference. The channel estimation method is described later in detail. In addition, in the following equations, a superscript denotes the sequential order of iterative reception performed by the iterative receiver.

Figure 4:
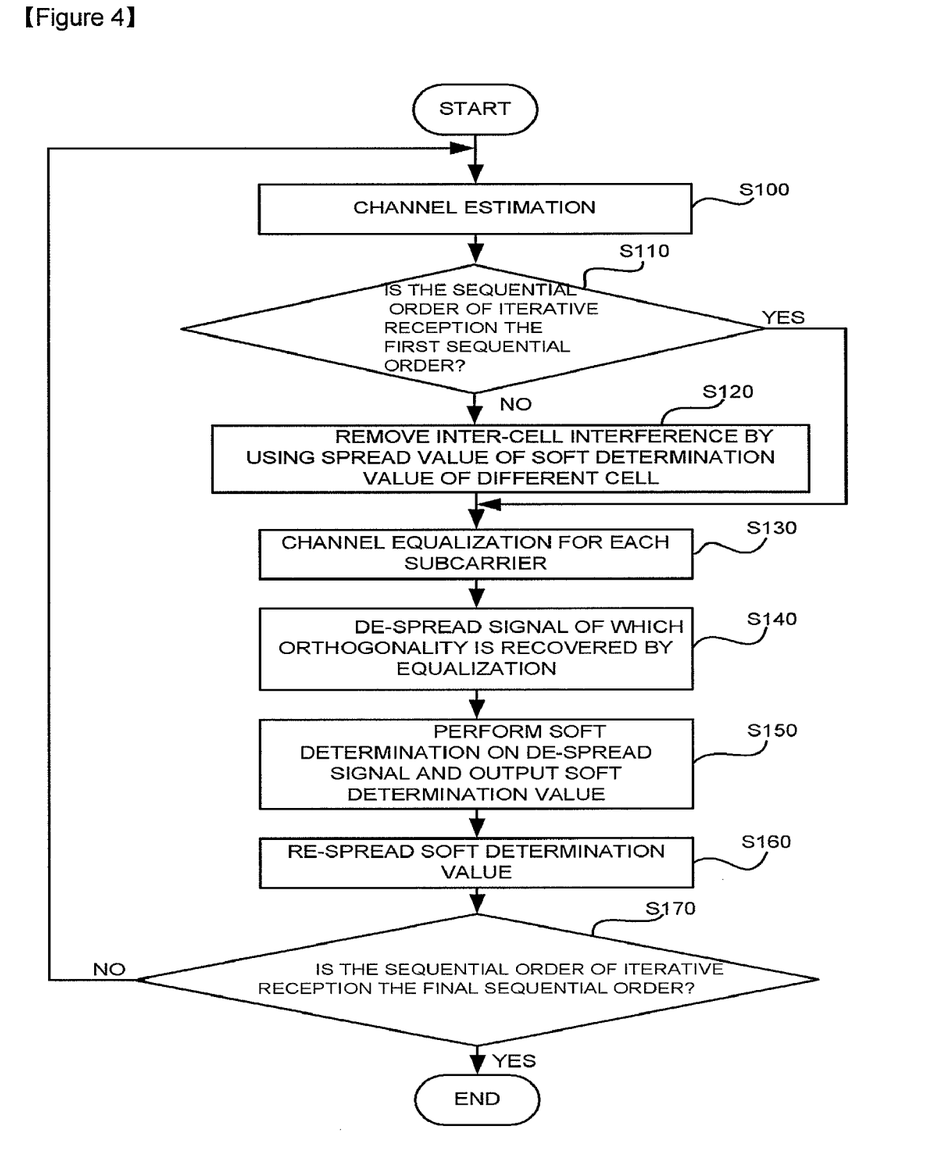
FIG. 4 is a flowchart illustrating an iterative reception method for removing inter-cell interference in an MC-CDMA system according to an embodiment of the present invention.

FIG. 4 is a flowchart illustrating an iterative reception method for removal of inter-cell interference in the MC-CDMA system according to the embodiment of the present invention.

Here, a method of removing inter-cell interference to the first cell signal is described with reference to FIG. 1 by exemplifying a case where a cell signal that is to be received by the iterative receiver is the first cell signal. However, the iterative receiver according to the embodiment of the present invention can remove the interference to other different cell signals as well as the specific cell signal that is to be received by the iterative receiver, and the same method of removing the interference used for the first cell signal is used for the different cells.

Referring to FIG. 4, the iterative receiver iteratively receives a signal that is iteratively transmitted from multiple cells in the multi-cell environment, and the channel estimator 160 performs channel estimation by using the pilot symbols of the received signal and outputs the channel estimation value (S100).

If the sequential order of iterative reception is not the first sequential order (S110), after the channel estimation, the parallel interference removers 110 alleviate the inter-cell interference by using the spread value of the soft determination value of the remaining cell (second cell) signal excluding the specific cell signal, that is, the first cell signal from the received signal (S120). Namely, the interference signal is estimated by using the soft determination value corresponding to the remaining cell (the second cell), and the estimated interference signal is removed from the received signal, so that the interference is alleviated. If the sequential order of iterative reception is the first sequential order, the process for alleviating the inter-cell interference by using the spread soft determination value may be omitted.

Next, the signal of which inter-cell interference is removed is subjected to channel equalization in units of a subcarrier signal in the equalizer 120 by using the channel estimation value, the interference noise variance value, the background noise variance value, and the orthogonality is recovered (S130).

The signal of which orthogonality is recovered is subjected to de-spreading in the de-spreader 130 (S140), and the de-spread signal is input to the soft determination unit 140 to be used to calculate the soft determination value obtained by performing the soft determination on the user symbol of which interference of different users in the specific cell is alleviated (S150).

Next, the soft determination value is subjected to re-spreading in the soft determination spreader 150 and input to the parallel interference removers 210 of the different cell (second cell), and the re-spread value of the soft determination value is used to remove the interference of the specific cell (first cell) signal from the different cell (second cell) signal.

Now, a method of removing interference shown in FIG. 4 according to the embodiment of the present invention is described in detail with reference to the accompanying drawings and equations.

Figure 5:
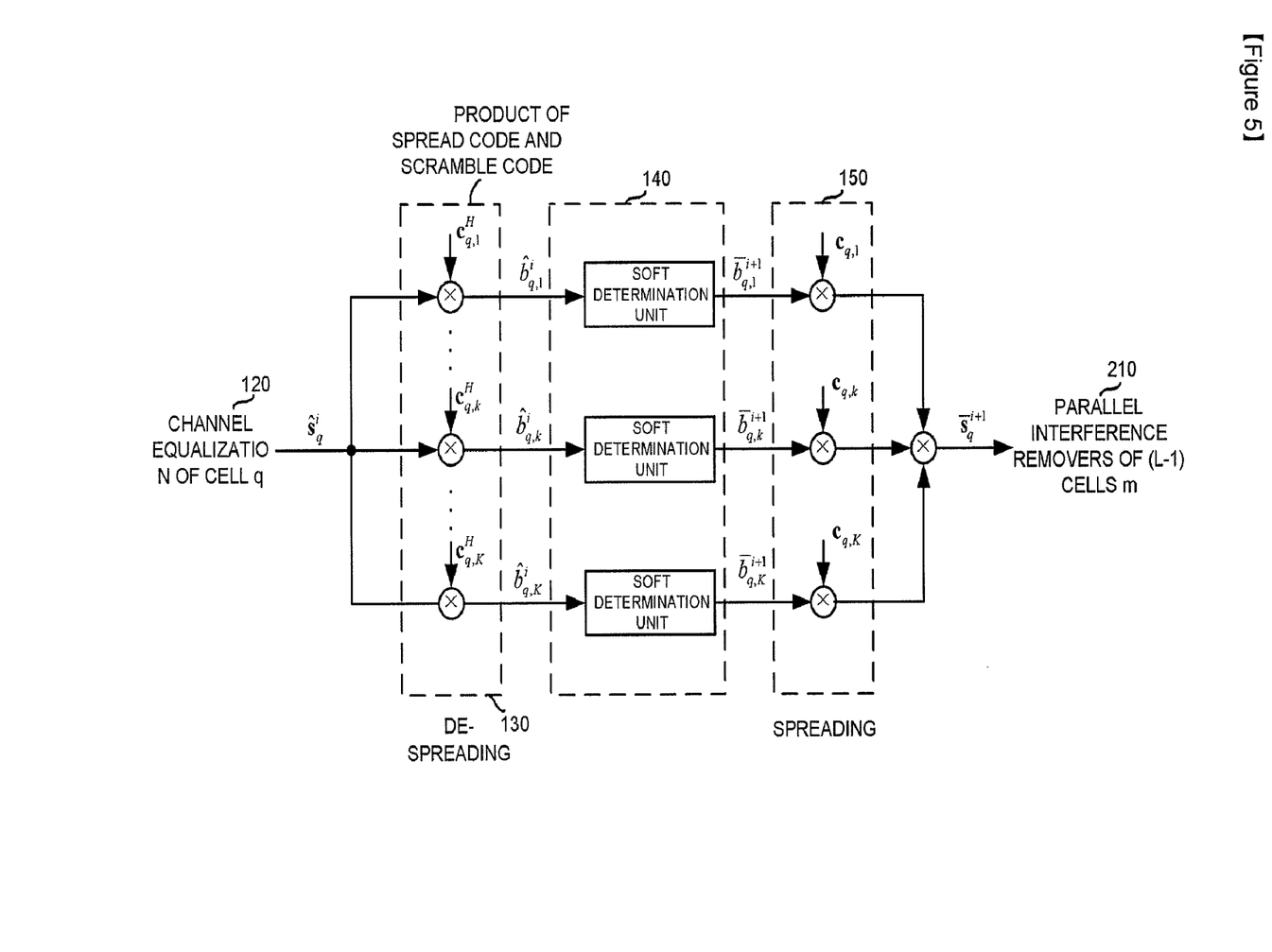
FIG. 5 is a flowchart illustrating an example of processes where a channel-equalized signal output from an equalizer is subjected to de-spreading, soft determination, and re-spreading according to an embodiment of the present invention.

FIG. 5 is a flowchart illustrating an example of processes where the channel-equalized signal output from the equalizer 120 is subjected to de-spreading, soft determination, and re-spreading according to the embodiment of the present invention.

Firstly, a method of generating the equalization coefficient in the equalizer 120 is described.

In a case where the sequential order of iterative reception of the iterative receiver is the first sequential order, since the soft determination value $\bar{b}_m^1$ of the different cell (hereinafter, the specific cell is denoted by q and all the different cells excluding the specific cell are denoted by m) does not exist, the parallel interference removers 110 for the first sequential order is not operated. Therefore, the input of the equalizer 120 becomes r instead of $r_q^1$.

In the embodiment of the present invention, as described, the MMSE is used for the channel equalization. Therefore, in the case of the first sequential order, an equalization coefficient vector $G_q^1$ of the equalizer 120 corresponding to the second cell is expressed by the following Equation 3.

$$G_q^1 = \underset{G_q^1}{\mathrm{argmin}} E\left[\|s_q - G_q^1 r\|^2\right] \qquad \text{(Equation 3)}$$

According to the embodiment of the present invention, the equalizer 120 performs the channel equalization in units of a subcarrier, so that separate equalization coefficients for the subcarriers are obtained. For example, the equalization coefficient for the l-th subcarrier in the q-th cell signal is calculated by the following Equation 4 in the equalization coefficient generation block 121.

$$G_{q,l}^1 = \frac{H_{q,l}^* E[|s_{q,l}|^2]}{|H_{q,l}|^2 E[|s_{q,l}|^2] + \sum_{m \neq q} |H_{m,l}|^2 E[|s_{m,l}|^2] + \sigma_n^2}$$ (Equation 4)

Here, $H_{q,1}$ denotes a channel matrix, which satisfies $E[|s_{q,l}|^2]=1$ as described above.

On the other hand, if the sequential order of iterative reception of the iterative receiver is not the first sequential order, the iterative receiver performs the spreading of the soft determination value of the different cell and uses the spread soft determination value to remove the inter-cell interference from the specific cell signal. For example, from the second sequential order to the final l-th sequential order, the removal of the interference is performed by using the soft determination value of the different cells excluding the q-th cell, that is, the specific cell, and the resulting signal $r_q^i$ is expressed by the following Equation 5.

$$r_q^i = r - \sum_{m \neq q} H_m \tilde{s}_m^i$$ (Equation 5)

$$= H_q s_q + \sum_{m \neq q} H_m \tilde{s}_m^i + n,$$

$$i = 2, 3, \ldots, I$$

Here, the spread signal of the soft determination value vector $\bar{b}_m^i$ of all users in the m-th cell is expressed by $\bar{s}_m^i = C_m \bar{b}_m^i$, and an interference error is expressed by $\tilde{s}_m^i = C_m \tilde{b}_m^i$. Therefore, in the second equation in Equation 5, the first term corresponds to the self signal of the q-th cell, and the second and third terms correspond to error terms, that is, the interference signals of the different cells.

As described above, the signal of which interference is removed by the parallel interference remover 110 is input to the equalizer 120 and subjected to the channel equalization. Here, the equalization coefficient obtained from the following Equation 6 is used. Equation 6 expresses the coefficient vector of the equalizer 120 with respect to the signal $r_q^i$ obtained by removing the interference of the q-th cell using Equation 5.

$$G_q^i = \underset{G_q^i}{\operatorname{argmin}} E\left[\|s_q - G_q^i r_q^i\|^2\right],$$ (Equation 6)

$$i = 2, 3, \ldots, I$$

Since the channel equalization is performed in units of a subcarrier of each cell, one equalizer 120 includes a plurality of single-tap MMSE equalizers of which number is the number L of subcarriers. Therefore, the above equation can be obtained based on the equalization coefficients for the subcarriers by the equalization coefficient generation block 121 of the single-tap MMSE equalizer. The following Equation 7 expresses the equalization coefficient corresponding to the l-th subcarrier signal in the q-th cell signal, and the same equation is used for other subcarrier signals.

$$G_{q,l}^i = \frac{H_{q,l}^* E[|s_{q,l}|^2]}{|H_{q,l}|^2 E[|s_{q,l}|^2] + \sum_{m \neq q} |H_{m,l}|^2 E[|\tilde{s}_{m,l}^i|^2] + \sigma_n^2}$$ (Equation 7)

Here, the variance $E[|\tilde{s}_{m,l}^i|^2]$ of the residual inter-cell interference signal of the l-th subcarrier signal in the m-th cell signal can be obtained under some assumptions.

Firstly, a correlation between an actual transmitting symbol and an estimated symbol of the l-th subcarrier signal of the k-th user is defined by $\phi_{k,l} = E[b_{k,l} \bar{b}_{k,l}]$. In addition, the estimated symbol $\bar{b}_{k,l}$ can be modeled as the following Equation 8.

$$\bar{b}_{k,l} = \phi_{k,l} b_{k,l} + \psi_{k,l}$$ (Equation 8)

In the above equation, if it is assumed that there is no correlation between the transmitting symbol $b_{k,l}$ and an error signal $\psi_{k,l}$ of the model, $E[\psi_{k,l}^2] = 2s_{k,l}(1 - s_{k,l})$ is obtained. As a result, the variance value of the residual interference signal corresponding to the l-th subcarrier signal in the k-th user is approximately expressed by the following Equation 9. The equalization coefficient is obtained from Equation 7 by using the obtained variance value.

$$E[|\tilde{s}_{k,l}|^2] \approx c_{k,l}^H (1 - \bar{b}_{k,l}^2) c_{k,l}$$ (Equation 9)

The signal that is subjected to the channel equalization using the equalization coefficient in the equalizer 120 is input to the de-spreader 130 as shown in FIG. 5. The signal obtained by de-spreading the signal output from the equalizer 120 in the de-spreader 130 is expressed by the following Equation 10.

$$\hat{b}_{q,k} = \sum_{l=0}^{L-1} c_{q,k,l}^* G_{q,l} r_{q,l}$$ (Equation 10)

$$= A_{q,k} b_{q,k} + \eta_{q,k}$$

Here, $A_{q,k} b_{q,k}$ denotes a scaled transmitting symbol, and $n_{q,k}$ denotes a noise term including intra-cell inter-user-symbol interference, inter-cell interference, and a background noise. The received-signal gain $A_{q,k}$ can be obtained from the following Equation 11.

$$A_{q,k} = \sum_{l=0}^{L-1} G_{q,l} H_{q,l} c_{q,k,l}^* c_{q,k,l}$$ (Equation 11)

In addition, a received-signal gain can be expressed by $$A_{q,k} = A_q = \frac{1}{L} \sum_{l=0}^{L-1} G_{q,l} H_{q,l},$$

of which values are equal for all users in the same cell signal.

In Equation 10, $n_{q,k}$, that is, the noise term including the intra-cell inter-user-symbol interference, the inter-cell interference, and the background noise can be obtained from the following Equation 12.

$$\eta_{q,k} = \sum_{k' \neq k} \left\{ \begin{array}{l} \sum_{l=0}^{L-1} G_{q,l} H_{q,l} c^*_{q,k,l} c_{q,k',l} b_{q,k'} + \\ \left( \sum_{m \neq q} \sum_{l=0}^{L-1} G_{q,l} H_{q,l} c^*_{q,k,l} \tilde{s}_{m,l} \right) + \\ \sum_{l=0}^{L-1} G_{q,l} c^*_{q,k,l} n_l \end{array} \right\} \quad \text{(Equation 12)}$$

Here, the first term denotes the intra-cell inter-user-symbol interference, the second term denotes the inter-cell interference, and the third term denotes the background noise. Hereinafter, in order to obtain the log-likelihood ratio (LLR) used to calculate the soft determination value $\overline{b}_{q,k}$, it is assumed that the interference noise term $n_{q,k}$ is taken as a Gaussian random variable.

The log-likelihood ratio generation block 141 of the soft determination unit 140 receives the signal $\hat{b}_{q,k}$ output from the de-spreader 130 and outputs the first log-likelihood ratio expressed by the following Equation 13.

$$LLR(\hat{b}_{q,k}) = \frac{4A_q}{\sigma_\eta^2(q,k)} \hat{b}_{q,k} \quad \text{(Equation 13)}$$

Here, $\sigma_n^2(q,k)$ denotes a variance of $n_{q,k}$. The first log-likelihood ratio is obtained based on the inter-cell interference, unlike a conventional interference removal scheme. In order to obtain the first log-likelihood ratio, the variance $\sigma_n^2(q,k)$ of the interference noise term $n_{q,k}$ is calculated as follows.

Firstly, the intra-cell inter-user-symbol interference is obtained from the following Equation 14.

$$E\left[ \left| \sum_{k' \neq k} \sum_{l=0}^{L-1} G_{q,l} H_{q,l} c^*_{q,k,l} c_{q,k',l} b_{q,k'} \right|^2 \right] = \quad \text{(Equation 14)}$$
$$[C_q^H G_q H_q C_q C_q^H H_q^H G_q^H C_q]_{k,k} - |A_q|^2$$

Here, $[\bullet]_{i,j}$ denotes an ij-th element of a matrix.

In order to obtain the variance $\sigma_n^2(q,k)$, the inter-cell interference is calculated by using the following Equation 15.

$$E\left[ \left| \sum_{m \neq q} \left( \sum_{l=0}^{L-1} G_{q,l} H_{q,l} c^*_{q,k,l} \tilde{s}_{m,l} \right) \right|^2 \right] = \quad \text{(Equation 15)}$$
$$\sigma_{\tilde{s}_{m,l}}^2 \left[ C_q^H G_q \sum_{m \neq q} (H_q H_q^H) G_q^H C_q \right]_{k,k}$$

Here, $E[|\tilde{s}_{m,l}|^2] = \sigma_{\tilde{s}_{m,l}}^2$. In addition, in order to obtain the variance $\sigma_n^2(q,k)$, the variance of the background noise is calculated by using the following Equation 16. Alternatively, the variance of the background noise may be empirically obtained.

$$E\left[ \sum_{l=0}^{L-1} |G_{q,l} c^*_{q,k,l} n_l|^2 \right] = \frac{\sigma^2 |G_{q,k}|^2}{L} \quad \text{(Equation 16)}$$

As a result, the log-likelihood ratio generation block 141 receives $G_q$, $H_q$, $C_q$, $\sigma^2$ and calculates the first log-likelihood ratio $LLR(\hat{b}_{q,k})$ by using the variance $\sigma_n^2(q,k)$ of the noise term.

The first log-likelihood ratio can be directly used to obtain the soft determination value $\overline{b}_{q,k}$ in a case where there is no inter-cell cooperation.

The determination unit 142 calculates the soft determination value $\overline{b}_{q,k}$ of a to-be-detected symbol by using the log-likelihood ratio, and the soft determination value can be obtained from the following Equation 17.

$$\overline{b}_{q,k} = \tanh\left( \frac{LLR(\hat{b}_{q,k})}{2} \right) \quad \text{(Equation 17)}$$

On the other hand, in a case where there is inter-cell cooperation, there is another method of calculating the soft determination value by using the log-likelihood ratio of which reliability is greatly improved through MAP decoding. In the method, firstly the first log-likelihood ratio output from the log-likelihood ratio generation block 141 is subjected to de-interleaving in the deinterleaver 143. The de-interleaved first log-likelihood ratio is input to the channel decoding block 144, and the channel decoding block 144 performs the MAP decoding to output a log-likelihood ratio of which reliability is improved, that is, the second log-likelihood ratio.

As a representative algorithm for calculating the soft determination value through the MAP decoding, there is a BCJR (Bahl-Cocke-Jeinek-Ravi) algorithm, and in the MAP decoding algorithm, a large calculation amount of the later-described soft determination value calculation process can be reduced, so that the calculation can be efficiently performed. In a linear Gaussian channel or a fading channel, the log-likelihood ratio of a transmitting signal x to an output y of a match filter through the channel decoding block 144 is as follows.

$$LLR(x|y) = \log \frac{P(x=+1|y)}{P(x=-1|y)} \quad \text{(Equation 18)}$$

By applying a Bayesian rule to the above equation, the following Equation 19 is obtained.

$$\begin{aligned} LLR(x|y) &= \log \frac{P(y|x=+1)P(x=+1)}{P(y|x=-1)P(x=-1)} \\ &= \log \frac{\exp\left(-\frac{E_s}{N_0}(y-a)^2\right)}{\exp\left(-\frac{E_s}{N_0}(y+a)^2\right)} + \log \frac{P(x=+1)}{P(x=-1)} \\ &= \frac{4a \cdot E_s}{N_0} \cdot y + LLR(x) \end{aligned} \quad \text{(Equation 19)}$$

Here, a is 1 in case of the Gaussian channel, and a corresponds to a fading amplitude in the case of the fading channel. In the above equation, the second term corresponds to the first log-likelihood ratio that is obtained from Equation 13 and output from the log-likelihood ratio generation block 141. As described above, sine the output of the channel decoding block 144 using the MAP decoding is obtained by using the channel decoding, a log-likelihood ratio having a higher reliability can be obtained.

The second log-likelihood ratio output from the channel decoding block 144 is input to the determination unit 142 and used to calculate the soft determination value $\bar{b}_q^{i+1}$. The calculated soft determination value is subjected to the interleaving, and is then subjected to the re-spreading in the soft determination spreader 150 by using the following Equation 20.

$$\bar{s}_q^{i+1} = C_q \bar{b}_q^{i+1} \quad \text{(Equation 20)}$$

Next, the spread signal is input to the parallel interference removers 210 of the (L−1) different cells m(m≠q) excluding the specific cell.

In the aforementioned embodiment, the method of removing the inter-cell interference is described under the assumption that accurate channel estimation is performed. However, in the orthogonal frequency division multiplexing (OFDM) system including a downlink MC-CDMA system, if the channel estimation is not accurate, the reception performance of the iterative receiver that is based on the inter-cell interference may be lowered in comparison with a conventional iterative receiver that is not based on the inter-cell interference.

Therefore, a method of improving the performance by using an expectation-value maximization (EM) algorithm in the channel estimation method according to the embodiment of the present invention is described.

As described above, the channel estimation method using the pilot symbol can be divided into methods of inserting the pilot symbol in a time domain or a frequency domain. In the embodiment of the present invention, the method of inserting the pilot symbol in the time domain is exemplified.

Figure 6:
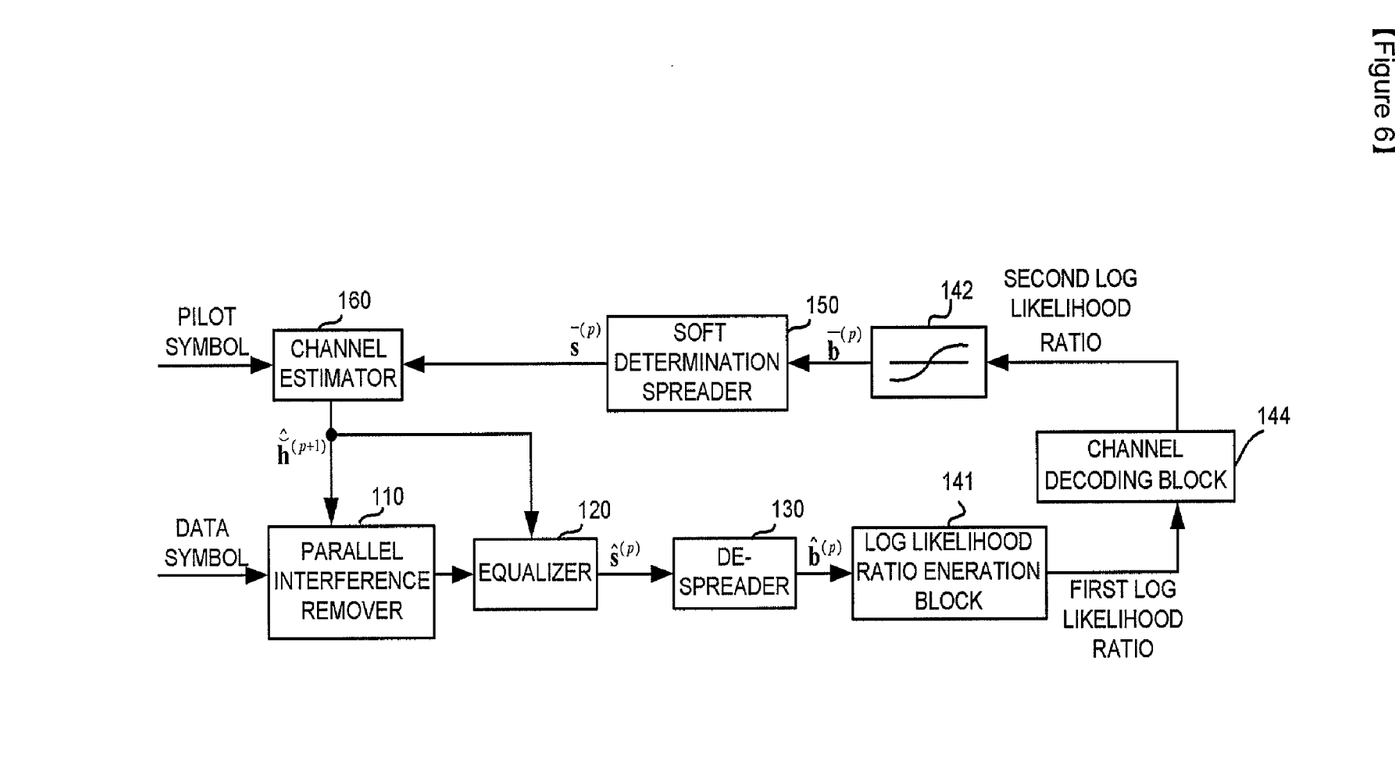
FIG. 6 illustrates an example of an iterative receiver having a channel estimator in a case where there is inter-cell cooperation according to an embodiment of the present invention.

FIG. 6 illustrates an example of an iterative receiver having the channel estimator 160 in a case where there is inter-cell cooperation according to an embodiment of the present invention.

Referring to FIG. 6, the channel estimator 160 according to the embodiment of the present invention iteratively performs the channel estimation every time the iterative receiver iteratively receives the signal, in which the soft determination value of a previously-received signal is used. In the channel estimation method, the channel estimation value is iteratively updated, so that a more accurate channel estimation value can be calculated.

Figure 7:
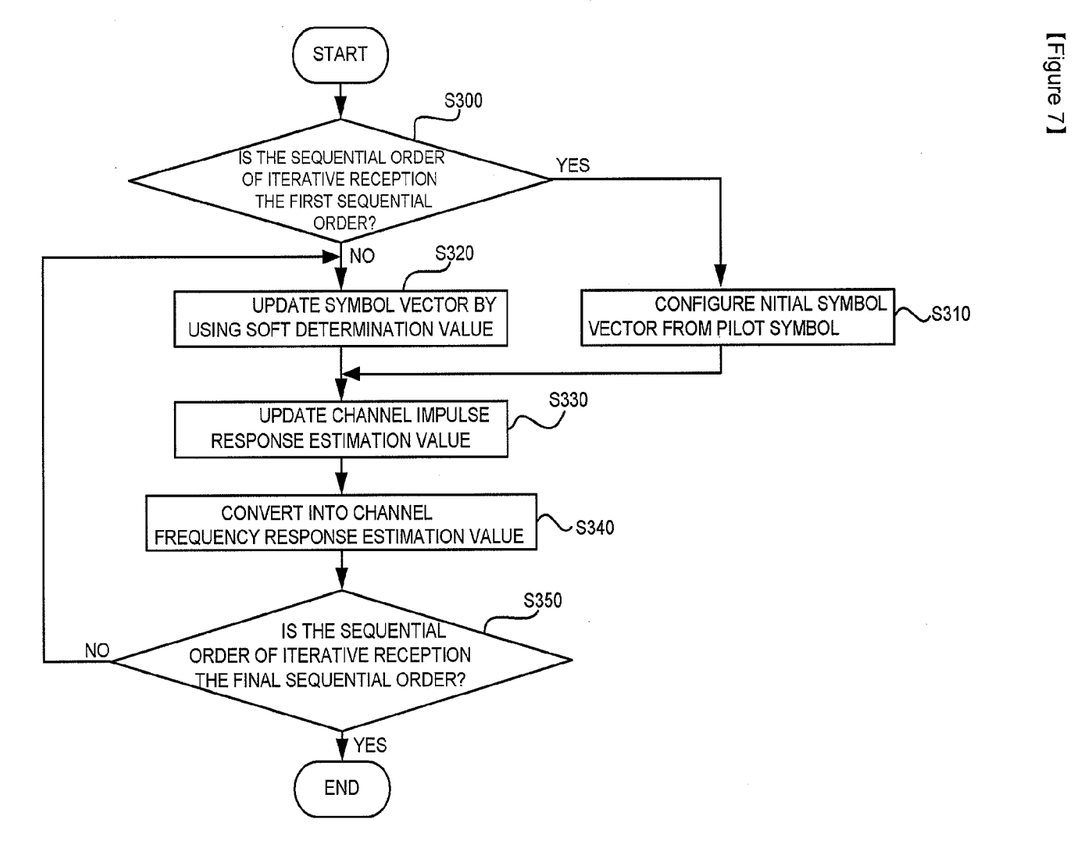
FIG. 7 is a flowchart illustrating a channel estimation method employing an EM algorithm in an iterative reception process according to an embodiment of the present invention.

FIG. 7 is a flowchart illustrating the channel estimation method employing the EM algorithm in the iterative reception process according to the embodiment of the present invention, in which the soft determination value is used so as to perform more accurate channel estimation.

Firstly, in order to perform the channel estimation using the EM algorithm, an initial value of the symbol vector used for the channel estimation is needed. If the sequential order of iterative reception is the first sequential order (S300), the iterative receiver constructs an initial symbol vector (S310). After that, every time the signal is iteratively received, the channel estimator 160 updates the symbol vector by using the signal obtained by re-spreading the soft determination value that is generated from the previously-received signal (S320).

Next, the initial symbol vector or the updated symbol vector is used to obtain the later-described channel impulse response estimation value (S330). Since the generated channel impulse response estimation value is a time domain value, the channel impulse response estimation value is transformed into a frequency domain in order to obtain the final value, that is, the channel estimation value. The channel impulse response estimation value is transformed into a channel frequency reaction estimate in the frequency domain (S350), so that the channel frequency reaction estimate becomes the channel estimation value.

In order to obtain the accurate channel estimation value, the channel estimation method is iteratively performed until the sequential order of iterative reception is the final sequential order (S350).

Now, the channel estimation method shown in FIG. 7 according to the embodiment of the present invention is described in detail by using equations.

In the following description, the channel estimation of the specific cell is exemplified, but the same channel estimation can be used for different cells. Therefore, in the following description, the subscript q denoting the sequential order of cell is omitted. In addition, a vector $\tilde{H}=[H_0, H_1, \ldots, H_{L-1}]^T$ is used instead of a channel frequency reaction matrix $H=\text{Diag}(H_0, H_1, \ldots, H_{L-1})$.

Therefore, if an N-dimensional vector corresponding to the channel impulse response estimation value is set to $h=[h_0, h_1, \ldots, h_{N-1}]^T$, the channel frequency reaction estimate and the channel impulse response estimation value have a relationship $\tilde{H}=F_{ch}h$. Here, an L×N matrix $F_{ch}$ is a discrete Fourier transform (DFT) matrix used to calculate the channel frequency reaction estimate, which is expressed as follows.

$$[F_{ch}]_{l,p} = e^{-j2\pi l p/L}$$

On the other hand, a maximum likelihood channel estimation method using a maximum likelihood estimation value of a received signal r expressed by Equation 2 is performed by using the following Equation 21.

$$\hat{h}_{ml} = \arg\max_h f(r|h) \quad \text{(Equation 21)}$$

Here, f(r|h) is a likelihood function of the received signal r to the channel impulse response estimation value h, in which the maximum likelihood estimation value is very difficult to calculate due to non-linearity of the function. However, according to the embodiment of the present invention, the maximum likelihood estimation value can be easily calculated by using the EM algorithm.

In order to use the EM algorithm, the received signal r of Equation 2 is expressed by the following Equation 22.

$$r = S\tilde{H} + n = SF_{ch}h + n \quad \text{(Equation 22)}$$

Here, a symbol matrix is expressed by $S=\text{Diag}(s_0, s_1, \ldots, s_{L-1})$, and a symbol vector of the symbol matrix is expressed by $s=[s_0, s_1, \ldots, s_{L-1}]^T$. At this time, in order to use the EM algorithm, the received signal r expressed by Equation 22 is set to an observed incomplete data, and the to-be-detected symbol s is set to an unobserved data. As a result, {r, s} can be set to a complete data. The EM algorithm is configured as follows.

Firstly, under the assumption that the to-be-detected symbol s as well as the received signal r are given, an expectation process of obtaining a likelihood function $Q(h|\hat{h}^{(q)})$ used to estimate the channel impulse response estimation value h is expressed by the following Equation 23.

$$Q(h|\hat{h}^{(p)}) = E[\log f(s,r|h)|r,\hat{h}^{(p)}] \quad \text{(Equation 23)}$$

-continued $$= -\frac{1}{N_0}(\|r\|^2 - 2\Re(r^H E_s[S|r, \hat{h}^{(p)}]F_{ch}h) + \|F_{ch}h\|^2)$$

Next, a maximization process for maximizing the likelihood function $Q(h|\hat{h}^{(q)})$ obtained in the expectation process is expressed by the following Equation 24.

$$\hat{h}^{(p+1)} = \underset{h}{\operatorname{argmax}} Q(h|\hat{h}^{(p)}) \quad \text{(Equation 24)}$$

$$= \underset{h}{\operatorname{argmax}} \{-2\Re(r^H \overline{S}^{(p)} F_{ch}h) + \|F_{ch}h\|^2\}$$

Here, the symbol vector is $\overline{S}_s^{(p)} = E[S|r,\hat{h}^{(q)}]$, which is updated based on the soft determination value of the previous (p-th) received signal. The channel impulse response estimation value $\hat{h}^{(p+1)}$ in the frequency domain obtained by transforming the channel impulse response estimation value into a frequency domain value can be expressed by the following Equation 25.

$$\hat{h}^{(p+1)} = \frac{1}{L} F_{ch}^H (\overline{S}^{(p)})^H r \quad \text{(Equation 25)}$$

Here, $\overline{S}^{(p)}$ denotes a diagonal matrix constructed with the re-spread symbols of the soft determination value obtained in the previous (p-th) order iterative reception process. The channel frequency reaction estimate $\hat{\tilde{H}}^{(p+1)}$ is obtained based on the aforementioned channel impulse response estimation value $\hat{h}^{(p+1)}$ by using the following Equation 26.

$$\hat{\tilde{H}}^{(p+1)} = F_{ch}\hat{h}^{(p+1)} = \frac{1}{L} F_{ch} F_{ch}^H (\overline{S}^{(p)})^H r \quad \text{(Equation 26)}$$

As a result, the channel frequency reaction estimate $\hat{\tilde{H}}^{(p+1)}$ becomes the channel estimation value, that is, the output of the channel estimator 160, which is input to the parallel interference remover 110.

As described above, the initial symbol vector used for the channel estimation is needed in order to perform the channel estimation using the EM algorithm. The initial symbol vector can be obtained by using the following Equation 27.

$$\overline{S}^{(1)} = C\overline{b}^{(1)} \quad \text{(Equation 27)}$$

Here, $\overline{b}^{(1)}$ is an initial vector in which pilot symbols are allocated to the positions of the pilot subcarriers and zero is allocated to the positions of other subcarriers. The performance of the EM algorithm is greatly dependent on the initial vector. Therefore, in order to obtain a higher channel estimation value, the pilot symbols needs to be more closely arranged. The channel estimator 160 iteratively performs a series of processes including the process of configuring the initial symbol vector and the channel estimation process until the final sequential order, so that the channel frequency reaction estimation value, that is, the channel estimation value, can be more accurately obtained.

According to the embodiment of the present invention, the inter-cell interference can be removed by using the soft determination value of the different cells, so that it is possible to reduce complexity and more efficiently remove the inter-cell interference in comparison with a conventional method of removing the interference in which an inverse of a matrix having a dimension of arbitrary spread factors needs to be calculated for every symbol. In addition, as described above, according to the embodiment of the present invention, the channel estimation value is updated by using the soft estimation value of a specific cell every time the reception is iteratively performed, so that it is possible to obtain more accurate channel estimation values.

Exemplary embodiments of the present invention can be implemented not only through the aforementioned method and/or apparatus but also through computer programs executing functions in association with the structures of the exemplary embodiments of the present invention or through a computer readable recording medium having the computer programs embodied thereon. The present invention can be easily implemented by those skilled in the art by using the above descriptions according to the exemplary embodiments.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

The invention claimed is:

1. An iterative reception method in which a receiver iteratively receives a signal including a first cell signal and at least one different-cell signal in a multi-cell environment, the iterative reception method comprising:
    performing soft determination on the cell signals included in the received signal and outputting soft determination values corresponding to the cell signals; and
    estimating an inter-cell interference signal corresponding to the at least one different-cell signal by using remaining soft determination values excluding the soft determination value corresponding to the first cell signal from the soft determination values and removing the inter-cell interference signal from the received signal.

2. The iterative reception method of claim 1, further comprising:
    performing channel estimation based on the cell signals included in the received signal and outputting channel estimation values corresponding to the cell signals; and
    performing channel equalization on the cell signals included in the received signal by using the channel estimation values,
    wherein the outputting of the soft determination value includes performing the soft determination on the channel-equalized cell signals and outputting the soft determination value.

3. The iterative reception method of claim 2,
    wherein the performing of the channel equalization comprises:
    generating equalization coefficients corresponding to subcarrier signals included in the cell signals by using a minimum mean squared error (MMSE) equalization algorithm; and
    performing channel equalization on the subcarrier signals corresponding to the equalization coefficients by using the equalization coefficients and outputting the channel-equalized subcarrier signals.

4. The iterative reception method of claim 1,
    wherein the outputting of the soft determination values comprises:

outputting first log-likelihood ratios of the cell signals in correspondence to interference noises included in the cell signals; and performing soft determination on the cell signals by using the first log-likelihood ratios and outputting the soft determination values.

5. The iterative reception method of claim 1, wherein the outputting of the soft determination value comprises:

outputting first log-likelihood ratios of the cell signals in correspondence to interference noises included in the cell signals;

performing channel decoding on the first log-likelihood ratios by using an MAP (Maximum A Posteriori) decoding algorithm and outputting second log-likelihood ratios on the cell signals; and performing soft determination by using the second log-likelihood ratios and outputting the soft determination values of the cell signals.

6. The iterative reception method of claim 4, wherein the interference noise includes intra-cell inter-user-symbol interference, background noise, and inter-cell interference corresponding to each cell signal.

7. The iterative reception method of claim 2, wherein the outputting of the channel estimation value comprises:

updating a symbol vector used for the channel estimation by using the soft determination value;

updating a channel impulse response estimation value by using the symbol vector; and transforming the channel impulse response estimation value into a frequency domain and outputting the channel estimation value.

8. The iterative reception method of claim 7, wherein the updating of the channel impulse response estimation value comprises:

calculating a likelihood function used for updating the channel impulse response estimation value by using an expectation-value maximization (EM) algorithm; and updating the channel impulse response estimation value by using the soft determination value and the likelihood function.

9. The iterative reception method of claim 1, wherein a subcarrier corresponding to the receiver is allocated to the same positions in the first cell signal and at least one different cell signal.

10. The iterative reception method of claim 1, wherein the received signal includes a control channel through which a modulation scheme and an encoding scheme of the first cell signal and at least one different cell signal are broadcasted.

11. An iterative receiver for iteratively receiving a signal including a first cell signal and at least one second cell signal in a multi-cell environment, comprising:

a first soft determination unit that performs soft determination on the second cell signal and outputs a first soft determination value; and a parallel interference remover that estimates an inter-cell interference signal by using the first soft determination value and removes the inter-cell interference signal from the received signal.

12. The iterative receiver of claim 11, further comprising:

a channel estimator that performs channel estimation based on the first cell signal and outputs a channel estimation value;

an equalizer that performs channel equalization on the first cell signal by using the channel estimation value and outputs a channel-estimated first cell signal; and a second soft determination unit that performs soft determination on a signal that is output from the equalizer and outputs a second soft determination value.

13. The iterative receiver of claim 11, wherein the equalizer includes single-tap minimum mean squared error (MMSE) equalizers of which number is the number of subcarrier signals included in the first cell signal, wherein the single-tap MMSE equalizer comprises:

an equalization coefficient generation block that generates an equalization coefficient corresponding to one of the plurality of subcarrier signals included in the first cell signal; and an equalizer that performs channel equalization on the subcarrier signal corresponding to the equalization coefficient by using the equalization coefficient and outputs the channel-equalized subcarrier signal.

14. The iterative receiver of claim 12, wherein the channel estimator performs channel estimation by using the second soft determination value every time the signal is received, and wherein an expectation-value maximization (EM) algorithm is used for the channel estimation.

15. The iterative receiver of claim 12, wherein the second soft determination unit comprises:

a log-likelihood ratio generation block that generates a first log-likelihood ratio by using an interference noise corresponding to the signal output from the equalizer; and a determination unit that generates the second soft determination value by using the first log-likelihood ratio.

16. The iterative receiver of claim 12, wherein the second soft determination unit comprises:

a log-likelihood ratio generation block that generates a first log-likelihood ratio by using an interference noise corresponding to the signal output from the equalizer; and a channel decoding block that performs channel decoding by using the first log-likelihood ratio and outputs a second log-likelihood ratio; and a determination unit that generates the second soft determination value by using the second log-likelihood ratio.

* * * * *